United States Patent
Le Cam et al.

(10) Patent No.: US 6,246,820 B1
(45) Date of Patent: *Jun. 12, 2001

(54) DEVICE FOR PLACING A STRUCTURAL ELEMENT IN A CABLE INSTALLATION CONDUIT IN ORDER TO SUB-DIVIDE IT

(75) Inventors: Joel Le Cam, Lannion; Jean-Luc Campion, Saint Quay Perros; Pierre Mignon, Lannion, all of (FR)

(73) Assignee: France Telecom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,146

(22) Filed: Oct. 28, 1999

(30) Foreign Application Priority Data

Nov. 2, 1998 (FR) .................................................. 98 13750

(51) Int. Cl.$^7$ ....................................................... G02B 6/44
(52) U.S. Cl. ..................... 385/100; 385/109; 385/110; 385/112; 138/111; 138/112; 138/113; 138/115; 138/116; 138/117; 165/154; 165/162
(58) Field of Search ..................................... 385/100, 101, 385/109, 110, 112, 114; 174/113 C, 131 A; 138/111, 112, 113, 114, 115, 116, 117, 157; 165/154, 157, 162

(56) References Cited

U.S. PATENT DOCUMENTS

| | | | |
|---|---|---|---|
| 4,529,009 | 7/1985 | Horner et al. | 138/111 |
| 4,804,020 | 2/1989 | Bartholomew | 139/111 |
| 4,906,496 | * 3/1990 | Hosono | 138/113 |
| 5,069,255 | * 12/1991 | Muszynski | 138/149 |
| 5,433,252 | * 7/1995 | Wolf | 138/113 |
| 5,920,032 | * 7/1999 | Aeschbacher | 174/113 C |
| 6,116,290 | * 9/2000 | Ohrn | 138/113 |

FOREIGN PATENT DOCUMENTS 2 730 101    2/1989   (FR) .

* cited by examiner

Primary Examiner—Cassandra Spyrou
Assistant Examiner—Leo Boutsikaris
(74) Attorney, Agent, or Firm—Nilless & Nilles SC

(57) ABSTRACT

In a device for placing a structural element in a cable installation conduit in order to sub-divide it, the structural element has a width close to the size of the internal perimeter of the conduit and comprises a plate surmounted by ribs. The device comprises a hot air inlet designed to soften the plate of the structural element; an external cylinder whose diameter is identical to that of the conduit, the cylinder comprising a shaping cone at one end in order to enable the softened structural element in order to gradually take a cylindrical shape; and an internal core fixedly held at a position located in the shaping cone of the external cylinder and positioned inside the softened structural element in order to give it a constant internal diameter when it is being shaped.

9 Claims, 3 Drawing Sheets

DEVICE FOR PLACING A STRUCTURAL ELEMENT IN A CABLE INSTALLATION CONDUIT IN ORDER TO SUB-DIVIDE IT

BACKGROUND OF THE INVENTION

1. Field of the Invention

The present invention relates to a device for placing a structural element in a cable installation conduit in order to sub-divide it. It relates especially to a method to position this structural element by means of the device of the invention.

Many networks presently consist of unitary conduits in order to obtain the circulation therein of a fluid or to take a cable for the conveyance of power or telecommunications signals.

2. Description of the Prior Art

The present-day optical fiber cables used in the new optical fiber telecommunications networks are highly dense (with high-capacity micro-sheathed or ribbon cables) or again very compact for low-capacity cables such as multiple-core fiber cables for example.

In the development of these new optical fiber telecommunications networks, FRANCE TELECOM has envisaged the optimizing of the available volume in the cable installation conduits by developing a multi-alveolate structural element designed to sub-divide a conduit. The fitting of such a structural element into a conduit has been envisaged in order to lay a larger number of cables in a conduit and to make them independent of one another, thus preventing the strains induced by the laying of a new cable from getting applied to cables already positioned in the structural element.

Thus, the French patent FR 2 730 101 describes a flat-conditioned multi-alveolate structural element designed to divide a cable installation conduit into several sections. The development of this structural element is recent. Hence, no device or method has yet been seriously designed to position it in a cylindrical conduit. Until now, the structural element has been given a cylindrical shape by having its ends clipped together, and it is cold-inserted into the conduit without any special precautions being taken.

The fact of keeping the structural element in its cylindrical shape (by clipping) leads to its embrittlement. The structural element tends to become more easily breakable, and its resistance to mechanical impact as well as to torsional and bending forces is greatly reduced. Furthermore, the fact that the structural element is cold-inserted into the conduit without any preliminary action on it causes the appearance of major frictional forces. All these problems thus prevent the laying of the structural element over great lengths. The laying lengths are indeed far smaller than the minimum required distance which is 300 meters and corresponds to the distance between two underground chambers.

The present invention makes it possible to overcome the drawbacks of the prior art. For this purpose, it proposes a simple and low-cost device enabling the placing of a structural element in a cylindrical conduit over a great length without any embrittlement or deterioration of this structural element.

SUMMARY OF THE INVENTION

The invention relates more particularly to a device for placing a structural element in a cable installation conduit, said structural element having a width close to the size of the internal perimeter of the conduit and comprising a plate surmounted by ribs designed to sub-divide said conduit, wherein the device comprises:

a hot air inlet designed to soften the plate of the structural element;

an external cylinder whose diameter is identical to that of the conduit, the cylinder comprising a shaping cone at one end in order to enable the softened structural element to gradually take a cylindrical shape; and an internal core fixedly held at a position located in the shaping cone of the external cylinder and positioned inside the softened structural element in order to give it a constant internal diameter when it is being shaped.

According to another characteristic of the invention, the device furthermore comprises pre-shaping rods positioned between the hot air inlet and the shaping cone of the external cylinder.

According to another characteristic, the device furthermore comprises rods to guide and hold the structural element that are fixed to the internal wall of the external cylinder and extend beyond its end opposite the shaping cone.

According to yet another characteristic of the invention, the internal core comprises an internal metal tube and an external casing made out of a material having a low coefficient of friction. This material is, for example, made of polytetrafluoroethylene.

According to yet another characteristic of the invention, the hot air inlet is positioned so that it is perpendicular to the plate of the structural element and located at a distance of 10 cm to 30 cm from said structural element.

Another object of the invention relates to a method for the placing of a structural element in a cable installation conduit, said structural element having a width close to the size of the internal perimeter of the conduit and comprising a plate surmounted by ribs designed to sub-divide said conduit, said method using the device according to the invention and comprising the following steps:

a) inserting a first length of structural element into the external cylinder, b) attaching the end of the first length of inserted structural element to a drawing rope that is itself linked to a winch placed at the end of the conduit, c) heating the plate of the structural element and carrying out a simultaneous drawing operation so that the structural element:

initially penetrates the external cylinder and gradually takes its cylindrical shape, an internal core being positioned inside the structural element to give it a constant internal diameter, and in a second stage, gets positioned along the conduit, d) sectioning the structural element at each end of the conduit, after this structural element has been positioned.

The heating temperature preferably ranges from 130° C. to 160° C. and the drawing speed is preferably from 2 to 3 meters/minute.

BRIEF DESCRIPTION OF THE DRAWINGS

Other particular features and advantages of the invention shall appear from the following description given as a non-restrictive example with reference to the, appended figures, of which.

MORE DETAILED DESCRIPTION

Figure 1:
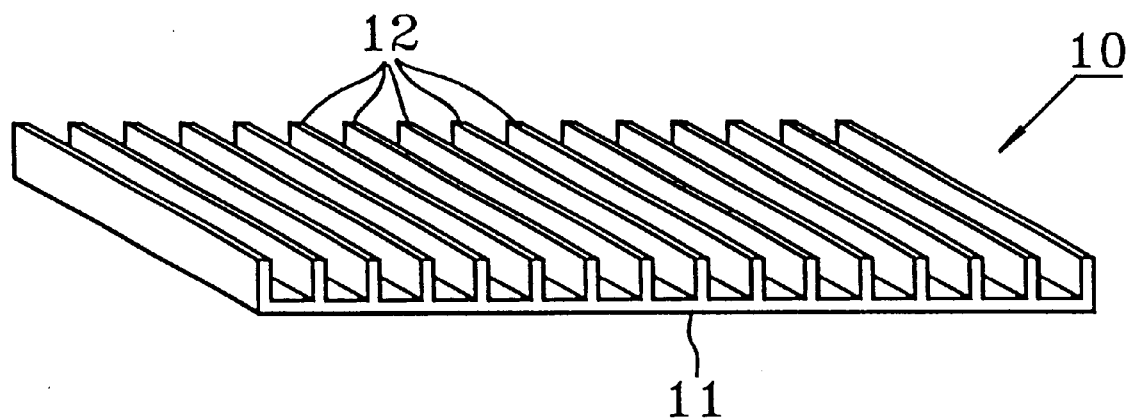
FIG. 1 shows an exemplary flat-conditioned structural element.

FIG. 1 shows an exemplary structural element 10 designed to be installed in a conduit in order to sub-divide it into several independent sections. This type of structural element 10 is flat-conditioned. It is made out of a material based on polyethylene or PVC (polyvinyl chloride). This type of material is indeed valuable because it behaves well under pressure. It has high tensile strength, a certain degree of flexibility and a relatively low coefficient of friction and may be placed around bobbins. The structural element 10 shown in FIG. 1 is what is called a "comb" structural element. It has a plate 11 surmounted by ribs 12 perpendicular to the plate and parallel to one another so as to form grooves. Naturally, this FIG. 1 shows only one example of a structural element to be installed in a conduit but this example is in no way restrictive. Other types of structural element may be acceptable. The device is indeed adaptable to different sizes and shapes of structural element. Thus the multi-alveolate structural element described in the patent FR 2 730 101 may also be appropriate.

Figure 2:
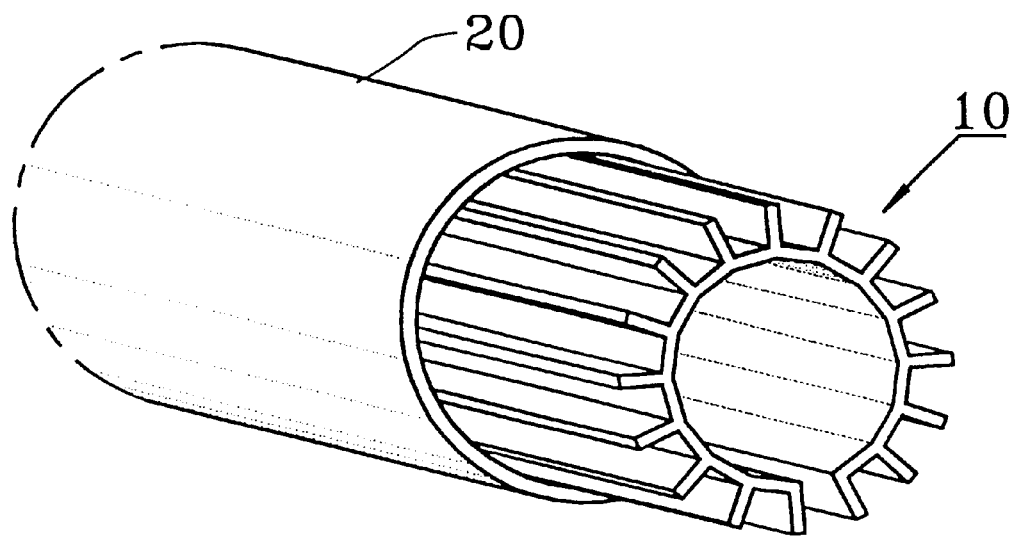
FIG. 2 shows a view in perspective of a cylindrical conduit occupied by the structural element of FIG. 1.

FIG. 2 gives a schematic view of the same structural element 10 as in FIG. 1, introduced into a cylindrical conduit 20. The ribs of the structural element are placed flat against the internal wall of the conduit and thus make it possible to sub-divide the conduit into several independent sections each designed to receive one optical fiber cable. The structural element 10 is furthermore cut so that its width is close to the size of the internal perimeter of the conduit 20.

Figure 3:
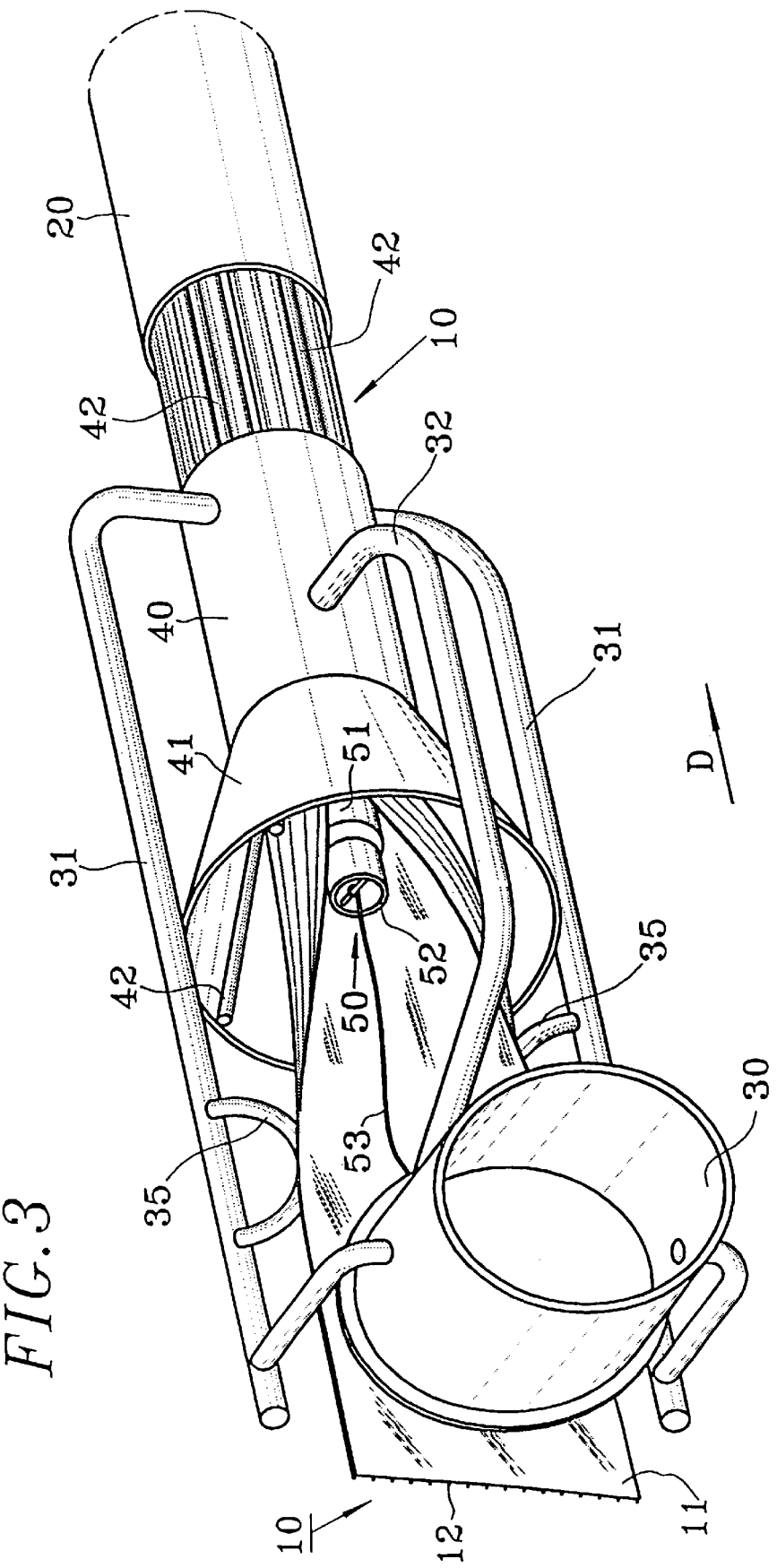
FIG. 3 shows a view in perspective of an embodiment of the device according the invention.
Figure 4:
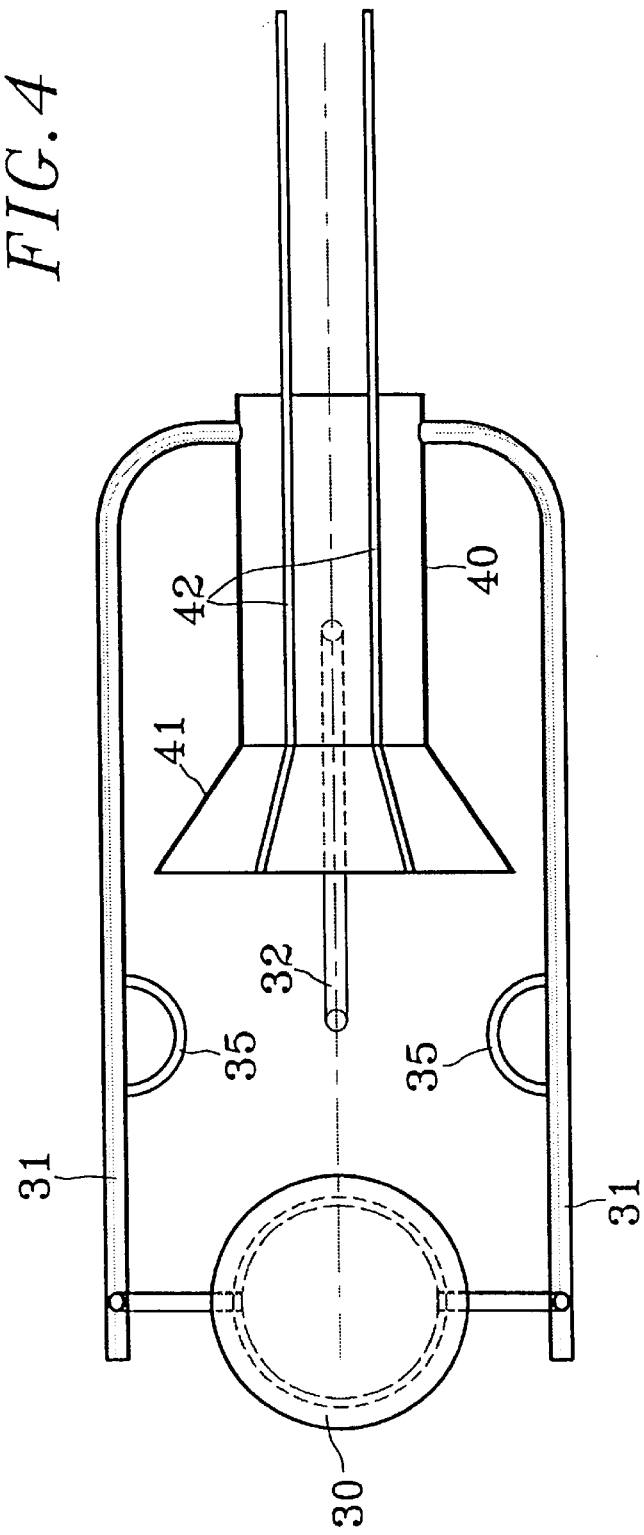
FIG. 4 shows a top sectional view of the device of FIG. 3.

The device according to the invention will be understood more clearly with reference to FIGS. 3 and 4 which respectively show a view in perspective and a top sectional view. The device according to the invention comprises a hot air inlet 30 and a guidance system 40, 50. The device is positioned facing the entrance to a conduit 20 that opens into an underground chamber. A thermally-insulated flexible conduit is fitted to the hot air inlet 30. This thermally-insulated flexible conduit, which is not shown in FIGS. 3 and 4, is designed to convey hot air produced by a system positioned outside the underground chamber. This hot air enables a heating and softening of the plate 11 of the structural element 10 so as to make it easier to put it into cylindrical shape.

The system of double guidance has an external cylinder 40 and an internal core 50. The diameter of the external cylinder 40 is preferably identical to or slightly smaller than the diameter of the conduit 20. This cylinder 40 is placed after the hot air inlet 30 in relation to the direction of shift of the structural element (this direction is shown schematically by arrow D in FIG. 3). A shaping cone 41 positioned at the front end of the external cylinder 40 enables the softened structural element 10 to gradually assume a cylindrical shape. The structural element 10 therefore emerges from the external cylinder 40 by the rear end, opposite the shaping cone 41, with a completely cylindrical shape and it may thus be positioned in the conduit 20. The external cylinder 40 is furthermore made out of a low-cost material such as a type of sheeting for example.

The internal core 50 is kept fixed at a location placed in the shaping cone 41 of the external cylinder. This core is furthermore positioned inside the softened structural element 10 in order to give it a constant internal diameter when it is being shaped. The core 50 is attached to a rigid cable 53 that itself ends in a terminal plate which cannot be seen in FIGS. 3 and 4. This terminal plate is designed to be adapted to the free end of a tubular element 32 which is itself fixed by its other end to the external cylinder. This fastening system thus enables the core 50 to be held in its position inside the shaping cone 41. This internal core 50 furthermore has the function of preventing the appearance of phenomena of contraction that are liable to occur during the shaping and simultaneous drawing of the structural element.

The hot air inlet 30 is positioned at a reasonable distance from the plate 11 of the structural element 10 so as not to damage it through heating that is excessively intense or excessively concentrated on a region of the structural element. This distance preferably ranges from 10 to 30 cm. The heating is done on the plate 11 of the structural element 10, namely on the side opposite the ribs, so as not to crush these ribs and so as to maintained properly shaped ribs. Furthermore, the hot air inlet 30 is positioned perpendicularly to the plate 11 of the structural element 10. Indeed it should not lean towards the shaping cone 41 and the conduit 20 as a propagation of hot air into the conduit could be detrimental to the structural element. Indeed, after it is shaped, the structural element 10 needs to be rapidly cooled. A spreading of residual hot air into the conduit may be sufficient to again soften the structural element which would then undergo unwanted deformation.

The device according to the invention may also comprise rods 42 for guiding and holding the structural element 10. These rods are not indispensable. There may be five or six of these rods for example. They are fixed in such a way as to be evenly spaced out on the internal wall of the external cylinder 40, and extend beyond the rear end of the cylinder 40 opposite the shaping cone 41. The structural element 10 is shaped by the external cylinder 40 and positioned in such a way that each rod 42 slides into a groove. These rods 42 not only enable the structural element 10 to be guided into the input of the conduit 20 but also enable it to be held. They make it possible to prevent a helical rotation of the structural element 10 which is not yet properly cooled and rigidified at the entrance to the conduit.

Pre-shaping rods 35 may furthermore be planned, in order to improve and further facilitate the cylindrical shaping of the structural element. They have, for example, a rounded shape and are positioned between the hot air inlet 30 and the shaping cone 41 of the external cylinder 40. These rods 35 thus make it possible to obtain a preform in the structural element 10 before it is given a definitive shape in the external cylinder 40.

Furthermore, two parallel bars 31 are used to hold the device all in one piece and fix the different constituent parts together. The hot air inlet 30, the external cylinder 40 and the pre-shaping rods 35 are especially fixed to these two bars 31.

To be able to draw the cylinder-shaped structural element 10 into the conduit 20, it is necessary to have a first sufficient length of structural element available at the entrance to the conduit 20, in order to attach a drawing rope thereto. This drawing rope is linked to a winch located at the other end of the conduit. For this purpose, a first step of the method for positioning the structural element 10 consists of the insertion of a first length of structural element into the external cylinder 40. This first length for example ranges from 1 m to 1.50 m. The introduction of this first length of structural element into the external cylinder 40 may be done either cold or after a slight heating of the end of the structural element. The way in which this insertion is done is of little importance given the fact that the first length inserted is used only to enable the fastening, in a second step of the method, of the drawing rope. If this first length is damaged, it is enough to section it at the exit from the conduit after the structural element has been positioned.

The system for fastening the drawing rope can be obtained in different ways. It may be a steel or braided nylon sleeve that is made to slide on to a first length of the structural element and that gets gripped around this structural element under the effect of tensile force. In another example, it may be a collar that is fixed by being tightened around a first length of the cylindrical structural element.

A third step of the method relates to the positioning itself. It consists in heating the plate of the structural element and simultaneously carrying out a drawing operation. Thus, initially, the structural element penetrates the external cylinder 40 and takes its cylindrical shape by means of the system 40, 50 of double guidance described here above. The heating softens the structural element to facilitate its shaping. The heating temperature preferably ranges from 130 to 160° C.

In a second stage, the cylindrical structural element obtained penetrates the conduit 20. The speed at which the structural element is drawn preferably ranges from 2 to 3 meters/minute.

In the last step of the method, after the structural element has been positioned along the conduit 20, its ends are sectioned at each end of the conduit.

The device according to the invention may furthermore be fastened to a prop or to any support that is facing the conduit 20. This fastening makes it possible to balance the device which will be subjected to the drawing stresses directly applied to the structural element.

Figure 5:
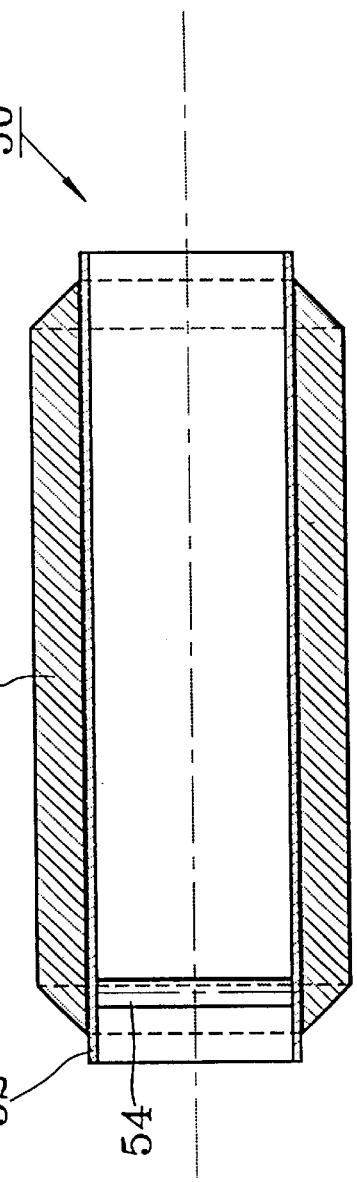
FIG. 5 shows a sectional view of an internal core of the device of FIG. 3.

FIG. 5 shows a sectional view of the internal core 50. This core actually comprises an internal metal tube 52 and an external casing 51 made out of a material with a low coefficient of friction in order to prevent any damage to the structural element through excessive frictional strains. The material constituting the external casing 51 may for example be polytetrafluoroethylene. The metal constituting the internal tube 52 may for example be stainless steel. Furthermore, a metal rod 54 is provided. This metal rod 54 goes through the internal tube 52 in order to catch the rigid cable 53 used to fasten the internal core 50.

The internal core 50 gives the structural element a total internal diameter that is constant. For example, this diameter may be about 50 mm. The internal core 50 furthermore does not need to be as long as the external cylinder 40. Its length is generally about 15 cm or less.

When it penetrates the conduit, the structural element 10 has a slight tendency to open. As a result, its ribs are placed flat against the internal walls of the conduit. To limit the frictional forces in the conduit and especially in the curved passages, the upper part of the ribs of the structural element may furthermore be slightly rounded. It is also possible to add a lubricant during the laying operation if the frictional forces are deemed to be still slightly high.

The structural element 10 laid by means of the device according to the invention causes no strain in the walls of the conduit apart from that of its own weight. During the laying operation, it behaves like a cable: the drawing forces come only from the friction resulting from its weight and its rigidity under bending forces. The structural element keeps this cylindrical shape permanently, and has high qualities of mechanical resistance to the drawing and wiring operations that it has to undergo.

What is claimed is:

1. A device for placing a structural element in a cable installation conduit, said structural element having a width close to the size of the internal perimeter of the conduit and comprising a plate surmounted by ribs designed to subdivide said conduit, wherein the device comprises:

a hot air inlet designed to soften the plate of the structural element;

an external cylinder whose diameter is identical to that of the conduit, the cylinder comprising a shaping cone at one end in order to enable the softened structural element to gradually take a cylindrical shape; and an internal core fixedly held at a position located in the shaping cone of the external cylinder and positioned inside the softened structural element in order to give it a constant internal diameter when it is being shaped.

2. A device according to claim 1, furthermore comprising pre-shaping rods positioned between the hot air inlet and the shaping cone of the external cylinder.

3. A device according to claim 1, furthermore comprising rods to guide and hold the structural element that are fixed to the internal wall of the external cylinder and extend beyond its end opposite the shaping cone.

4. A device according to claim 1, wherein the internal core comprises an internal metal tube and an external casing made out of a material having a low coefficient of friction.

5. A device according to claim 4, wherein the external casing of the internal core is made of polytetrafluoroethylene.

6. A device according to claim 1, wherein the hot air inlet is positioned so that it is perpendicular to the plate of the structural element and located at a distance of 10 cm to 30 cm from said structural element.

7. A method for the placing of a structural element in a cable installation conduit, said structural element having a width close to the size of the internal perimeter of the conduit and comprising a plate surmounted by ribs designed to sub-divide said conduit, said method using the device according to one of the claims 1 to 6 and comprising the following steps:

a) inserting a first length of structural element into the external cylinder, b) attaching the end of the first length of inserted structural element to a drawing rope that is itself linked to a winch placed at the end of the conduit, c) heating the plate of the structural element and carrying out a simultaneous drawing operation so that the structural element:

initially penetrates the external cylinder and gradually takes its cylindrical shape, an internal core being positioned inside the structural element to give it a constant internal diameter, and in a second stage, gets positioned along the conduit, d) sectioning the structural element at each end of the conduit, after this structural element has been positioned.

8. A method according to claim 7, wherein the heating temperature ranges from 130° C. to 160° C.

9. A method according to claim 7, wherein the drawing speed is from 2 to 3 meters/minute.

* * * * *